E. H. REFIOR.
BUMPER.
APPLICATION FILED JULY 9, 1920.

1,368,292. Patented Feb. 15, 1921.

INVENTOR
Edward H. Refior,
by
Owen, Owen & Crampton.

UNITED STATES PATENT OFFICE.

EDWARD H. REFIOR, OF TOLEDO, OHIO.

BUMPER.

1,368,292.

Specification of Letters Patent.

Patented Feb. 15, 1921.

Application filed July 9, 1920. Serial No. 394,900.

*To all whom it may concern:*

Be it known that I, EDWARD H. REFIOR, a citizen of the United States, and a resident of Toledo, in the county of Lucas and State of Ohio, have made an Invention Appertaining to Bumpers; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an elastic bumper which may be readily adjusted to automobiles of different makes and which also may be readily connected to the side bars of chassis of different forms. The invention has for its object to provide other advantages and features which will appear from the following description and upon examination of the drawings.

Constructions containing my invention may be modified in form without departing from the spirit of the invention. To illustrate a practical application of the invention I have selected a bumper and its attaching means containing the invention as an example and shall describe it hereinafter. The bumper selected is illustrated in the accompanying drawings.

Figure 1:
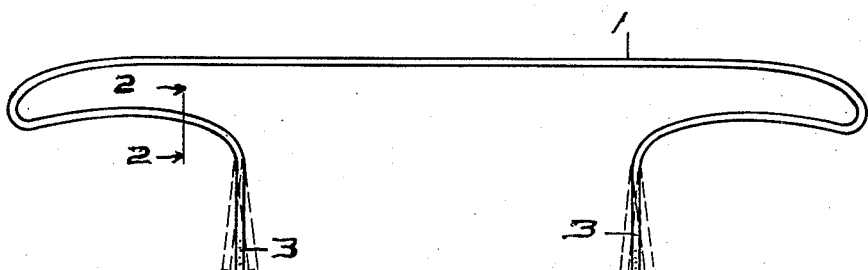
Figure 2:
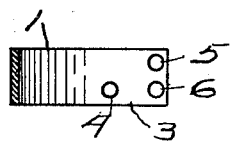
Figure 3:
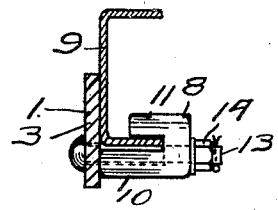
Figure 5:
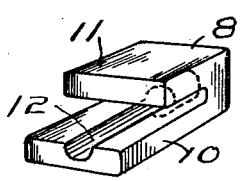
Figure 4:
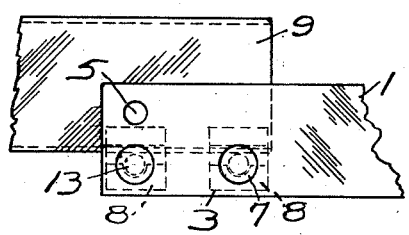

Figure 1 of the drawings illustrates a top view of the bumper showing a conventional way, the manner in which it may be adjusted for automobiles of different makes. Fig. 2 is a sectional view taken on the line 2—2 indicated in Fig. 1. Fig. 3 is a sectional view of the bumper and of a side bar of a chassis of an automobile. Fig. 4 shows the bumper attached to the frame of the automobile. Fig. 5 is a perspective view of the detail also shown in Fig. 2.

1 indicates a spring bumper which is bent T-shaped to give yieldability to the bumper. The bumper is made of flat spring bar metal which is elastic and thus gives recoil to the bumper when it has been deformed or deflected from its normal position. The ends 3 of the flat metal having a considerable relative length and being elastic, permits the bumper to be attached to the side bars or frames of automobiles of different makes. The distances between the side bars of a great variety of makes of automobiles does not differ more than about two inches. The ends 3 of the bumper may thus by reason of their elasticity be sprung so as to fit the varying distances between the side bars of the frames of different automobiles as indicated in Fig. 1.

The ends of the bumper are provided with the holes 4, 5 and 6. In order to readily secure the bumper to the frame, four U-shaped clamping members 8 are provided which will fit over the flanges of the channel or side bar 9. The sides of each U-member will quite closely fit a flange of the channel bar 9. One of the legs 10 of the U-member is located on the under side of the channel bar and may be made slightly longer than the other leg 11 of the U-member 8 and so as to extend slightly beyond the bar to prevent tilting of the end of the bumper if a rivet head or nut should be located in the end of the channel bar.

The U-member may be also provided with a channel 12 substantially cylindrical in form and in line with the opening for receiving the bolt 13. The bolt 13 thus lies close to the side of the flange of the channel bar 9 while at the same time the leg 11 lies on the inside of the flange and when the bolt 13 is inserted through one of the openings 5 or 6 of the bumper and the nut 14 threaded on to the bolt, the bumper will be tightly clamped to the channel bar 9. The bolt 7 passes through the opening 4 and a U-member 8 which rigidly secures the bumper to the channeled side bar of the chassis. In order to secure a variation of the angular relation between the bumper and the channel bar 9, the bolt may be inserted either through the opening 6 or through the opening 5. If it is inserted through the opening 5 it will raise the bumper 1 above the position that it would be in if the bolt 13 is inserted through the opening 6, inasmuch as the bolt 7 that extends through the opening 4 remains fixed. The bumper may thus be turned on the bolt 7 to take two different positions.

I claim:

In a T-shaped bumper for automobiles, formed of flat bar metal, the ends of the bumper extending parallel to each other and substantially at right angles to the front of the bumper, the bumper being provided with openings, one of the openings of each end located remote from the said end edge of the bumper, a bolt for securing each end of the bumper to a channel side bar of the automobile, a U-shaped member for clamping a flange of each channel side bar, one of the legs of the U-member extending within the channel and the other of the legs of the U located on the outside of the channel, the U-member having a channel and an opening and a bolt extending through the opening and longitudinally through the channel and through one of the openings of the bumper.

In testimony whereof I have hereunto signed my name to this specification.

EDWARD H. REFIOR.